United States Patent [19]

Schwander et al.

[11] 3,862,192
[45] Jan. 21, 1975

[54] FIBRE-REACTIVE ANTHRAQUINONE COMPOUNDS

[75] Inventors: Hansrudolf Schwander, Riehen; Peter Hindermann, Rottmingen, both of Switzerland

[73] Assignee: Ciba-Geigy AG, Basel, Switzerland

[22] Filed: Jan. 29, 1973

[21] Appl. No.: 327,527

[30] Foreign Application Priority Data

Feb. 4, 1972   Switzerland.......................... 1691/72

[52] U.S. Cl............................. 260/372, 8/39, 8/40
[51] Int. Cl. ......................... C09b 1/40, C09b 1/52
[58] Field of Search..................................... 260/372

[56]            References Cited
           UNITED STATES PATENTS
3,538,128   11/1970   Schwander et al. ................ 260/372

FOREIGN PATENTS OR APPLICATIONS
  903,590   8/1962   Great Britain..................... 260/372

*Primary Examiner*—Lorraine A. Weinberger
*Assistant Examiner*—E. Jane Skelly
*Attorney, Agent, or Firm*—Joseph G. Kolodny; Edward McC. Roberts; Prabodh I. Almaula

[57]          ABSTRACT

Fibre-reactive anthraquinone compounds of the formula

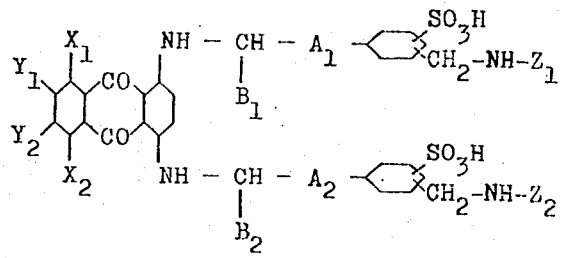

(1), wherein $X_1$ and $X_2$ each represents a hydrogen atom or a hydroxy group and $Y_1$ and $Y_2$ each represents a hydrogen atom or a halogen atom, $A_1$ and $A_2$ each represents an alkylene radical with 1 to 4 carbon atoms or a direct bond, $B_1$ and $B_2$ each represents an alkyl radical with 1 to 5 carbon atoms, the total number of carbon atoms in $A_1$ and $B_1$ and $A_2$ and $B_2$ being not greater than 5, and $Z_1$ and $Z_2$ each represents a halogenated aliphatic acyl radical with 2 or 3 carbon atoms, and wherein both phenyl radicals can contain further substituents are suitable for dyeing and printing materials of the most diverse kind.

8 Claims, No Drawings

FIBRE-REACTIVE ANTHRAQUINONE COMPOUNDS

The invention relates to fibre-reactive anthraquinone compounds of the formula

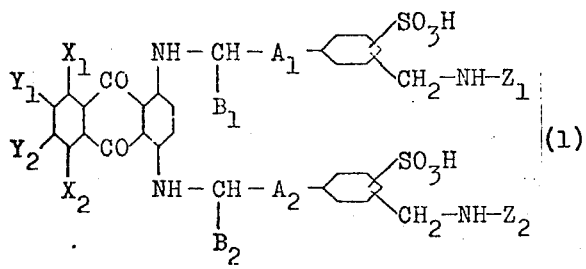

(1)

wherein $X_1$ and $X_2$ each represents a hydrogen atom or a hydroxy group and $Y_1$ and $Y_2$ each represents a hydrogen atom or a halogen atom, $A_1$ and $A_2$ each represents an alkylene radical with 1 to 4 carbon atoms or a direct bond, $B_1$ and $B_2$ each represents an alkyl radical with 1 to 5 carbon atoms, the total number of carbon atoms in $A_1$ and $B_1$ and $A_2$ and $B_2$ being not greater than 5, and $Z_1$ and $Z_2$ each represents a halogenated aliphatic acyl radical with 2 or 3 carbon atoms, and wherein both phenyl radicals can contain further substituents.

If $X_1$ in formula (1) is a hydroxy group, then preferably $Y_1$ and $Y_2$ is each a hydrogen atom and $X_2$ is also a hydroxy group. Possible halogen atoms represented by $Y_1$ and $Y_2$ are especially chlorine or bromine atoms. Preferred compounds are those of the formula (1), wherein $X_1$, $X_2$, $Y_1$ and $Y_2$ represent hydrogen atoms. The alkylene radicals $A_1$ and $A_2$ and the alkyl radicals $B_1$ and $B_2$ can be straight-chain or branched. Preferably, $A_1$ and $A_2$ contain more carbon atoms than the radicals $B_1$ and $B_2$; and, in particular, $A_1$, $A_2$, $B_1$ and $B_2$ are pure hydrocarbon radicals. Preferred compounds are those of the formula (1), wherein $A_1$ and $A_2$ and $B_1$ and $B_2$ represent similar alkylene and alkyl radicals respectively, i.e., wherein both alkylene chains are of equal length or contain the same chain branchings, and wherein also both side chains contain the same number of carbon atoms. Also possible, however, are compounds with dissimilar radicals $A_1$ and $A_2$ and $B_1$ and $B_2$, i.e., with alkylene chains or side-chains within a molecule which differ in length or are differently substituted. The total number or carbon atoms in the alkylene chain between -NH group and phenyl radical, including the side-chain $B_1$ and $B_2$ bonded to the alkylene chain, is 6. Particularly valuable compounds of the formula (1) are those wherein $A_1$ and $A_2$ represent the ethylene radical and $B_1$ and $B_2$ represent the methyl radical, and wherein therefore 1-methylpropylene chains are present.

In the same way as the alkylene radicals and the side-chains bonded thereto, the acyl radicals $Z_1$ and $Z_2$ can also be similar or dissimilar. Preferably $Z_1$ and $Z_2$ are similar radicals and, in particular, each represents a chloroacetyl, $\alpha,\beta$-dibromopropionyl or $\alpha$-bromoacrylyl radical.

Examples of further possible substituents at the phenyl radicals are halogen atoms, such as chlorine or bromine atoms, and low molecular alkyl or alkoxy groups, such as the methyl, ethyl, propyl, isopropyl, butyl, methoxy, ethoxy or isopropyloxy group. But besides the sulphonic acid group and the haloacylaminomethyl group, the phenyl radicals advantageously contain no further substituents.

A preferred embodiment of the fibre-reactive anthraquinone compounds of the formula (1) is therefore, for example, the compound of the formula

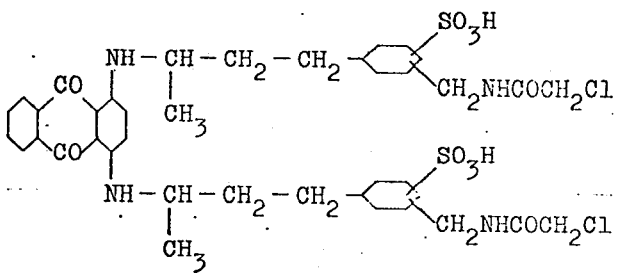

The fibre reactive anthraquinone compounds of the formula (1) are manufactured by reacting corresponding anthraquinone compounds with N-methylol compounds of aliphatic halocarboxylic amides, or with functional derivatives thereof which react like these N-methylol compounds, under such conditions that a replaceable hydrogen atom is replaced by a halocarboxylic amidomethyl group (A. Einhorn, Liebigs Annalen der Chemie, 343 (1905) 207 and 361 (1908) 113). Following the methylol condensation, the condensation product is sulphurised.

The process consists in reacting anthraquinone compounds of the formula

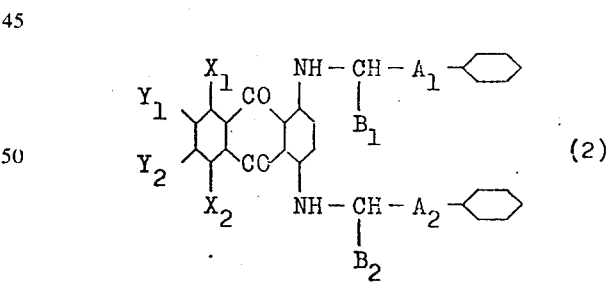

(2)

wherein $X_1$, $X_2$, $Y_1$, $Y_2$, $A_1$, $A_2$, $B_1$ and $B_2$ have the meanings given in the explanation of the formula (1), and both phenyl radicals can contain further substituents, with N-methylol compounds of the formula

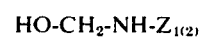

(3)

in which $Z_{1(2)}$ has the meaning given in the explanation of the formula (1).

The sulphonic acid groups contained in the two phenyl radicals in the anthraquinone compounds of the formula (1) are already present in the starting material. Preferably, however, they are introduced during or after the methylol condensation by sulphonation.

The position of entry of the sulphonic acid groups and of the haloacylaminomethyl groups is not always the same and is therefore here not defined. By appropriate nucleophilic substitution of the phenyl radicals it is possible to promote the acylaminomethylation and thereby optionally also to determine the bonding position of the haloacylaminomethyl groups which are introduced.

The starting materials of the formula (2) are obtained in a manner known per se by reacting anthraquinone (or the leuco compounds thereof), which in 1- and 4-position contain one substituent which can be replaced by a phenylalkylamino group, with phenylalkylamines which correspond to the phenylalkylamino radicals bonded in 1- and 4-position in the compounds of the formula (2). Examples of possible replaceable substituents in 1- and 4-position of the anthraquinone are chlorine or bromine atoms or, in particular, hydroxy groups. The reaction is carried out for example in solution, in the melt of the excess phenylalkylamine or in a solvent which does not participate in the reaction.

Starting materials of the formula (2), which in 1- and 4-position of the anthraquinone nucleus contain different phenylalkylamino radicals, are obtained by reacting firstly an anthraquinone, which in 1- and 4-position contains one replaceable substituent, with a phenylalkylamine in the molar ratio 1:1, and subsequently reacting the resulting condensation product with another phenylalkylamino to give the desired compound of the formula (2).

As anthraquinones which contain in 1- and 4-position a replaceable substituent and which are suitable for the manufacture of compounds of the formula (2) there may be cited:

1,4-dichloro-(or 1,4-dibromo-)anthraquinone.
1,4-dihydroxyanthraquinone (quinizarine)
1,4,5,8-tetrahydroxyanthraquinone
1,4,5-trihydroxyanthraquinone
1,4,6-trichloro-(or 1,4,6-tribromo-)anthraquinone
1,4,6,7-tetra-(or 1,4,6,7-tetrabromo-)anthraquinone
1,4-dihydroxy- 6,7-dichloroanthraquinone
1,4-dihydroxy-6,7-dibromo-anthraquinone
1,4-dihydroxy-6-6-chloro-anthraquinone
1,4-dihydroxy-6-bromo-anthraquinone.

Suitable aralkylamines for reaction with these anthraquinones are:

1-phenyl-2-amino-propane
1-phenyl-3-amino-butane
1-(2'-chlorophenyl)-2-amino-propane
1-(4'-chlorophenyl)-2-amino-propane
1-(2'-methylphenyl)-2-amino-propane
1-(4'-methylphenyl)-2-amino-propane
1-(2',4'-dimethylphenyl)-2-amino-propane
1-(2'-methoxyphenyl)-2-amino-propane
1-phenyl-2-amino-butane
1-(2'-methylphenyl)-3-amino-butane
1-(4'-methylphenyl)-3-amino-butane
1-(2',4'-dimethylphenyl)-3-amino-butane
1-(2'-chlorophenyl)-3-amino-butane
1-(4'-chlorophenyl)-3-amino-butane
1-(2'-methoxyphenyl)-3-amino-butane
1-phenyl-2-methyl-3-amino-butane
1-(2'-methylphenyl)-2-methyl-3-amino-butane
1-phenyl-3-amino-pentane
2-phenyl-2-methyl-4-amino-pentane
2-(4'-methylphenyl)-2-methyl-4-amino-pentane
1-(3'-chlorophenyl)-2-amino-propane
1-(4'-chlorophenyl)-2-amino-butane
1-(2'-chlorophenyl)-2-amino-butane
1-(3'-chlorophenyl)-3-amino-butane
1-(2',5'-dimethylphenyl)-3-amino-butane
1-(2'-chlorophenyl)-2-methyl-3-amino-butane
1-(4'-chlorophenyl)-2-methyl-3-amino-butane
1-phenyl-2-methyl-3-amino-pentane
1-(2'-chlorophenyl)-2-methyl-3-amino-pentane
1-(2'-chlorophenyl)-3-amino-pentane
1-(4'-chlorophenyl)-3-amino-pentane.

The N-methylol compounds of the formula (3) used as second reactant for the manufacture of the fibre-reactive anthraquinone compounds of the formula (1) are obtained by addition of formaldehyde to halocarboxylic acid amides with the aid of condensation agents, for example potassium carbonate, but also by treatment with a mineral acid under mild conditions. In the present instance, for example, the N-methylol compounds of the following halocarboxylic acid amides are suitable:

monochloroacetamide
monobromoacetamide
$\alpha$-chloro-(or-$\alpha$-bromo-)propionic amide
$\beta$-chloro-(or $\beta$-bromo-)propionic amide
$\alpha,\beta$-dichloro-(or $\alpha,\beta$,-dibromo-)propionic amide
$\alpha$-chloro-(or $\alpha$-bromo-)acrylic amide.

In view of the easy accessibility and also of the good tinctorial properties of the end products obtainable therefrom, the preferred reactants are N-methylol-chloroacetamide and B-methylol-$\alpha,\beta$-dibromopropionic amide.

The condensation of the dyes with the methylol compounds takes place in the presence of acid condensation agents or of dehydrating agents which react as such. As such there may be used primarily concentrated hydrochloric acid, zinc chloride, phosphorus pentoxide, acetic anhydride, sirupy phosphoric acid and oleum. However, the preferred condensation agent is concentrated to anhydrous sulphuric acid, because as a rule it can be used simultaneously as solvent for the reactants. The reaction temperature can fluctuate within wide limits and depends chiefly on the condensation agent used. In concentrated sulphuric acid the reaction proceeds as a rule rapidly and completely at room temperature. It is sometimes necessary to carry out the process at elevated temperature, for example at 40° to 80°C. The finished reaction products are precipitated by pouring the sulphuric acid solutions or suspensions into ice water and isolating the precipitates in the usual manner.

In place of halocarboxylic -N-methylolamides it is also possible to use reactive functional derivatives of these methylol compounds, provided they react in the same way. Examples of suitable reactive functional derivatives are the esters which are obtainable by treating the methylol compounds with inorganic or organic acids or acid halides or anhydrides, also the di(carboxylic-aminomethyl) ethers obtainable by self-condensation in the presence of e.g., phosphorus oxychloride. However, since it is necessary to manufacture these funtional derivatives from the methylol compounds, preference is given to the first mentioned process. However, in individual instances in which the method of Einhorn yield unsatisfactory results, it is possible to achieve the object with these derivatives, chiefly with the N-chloromethylamides. On occasion it is possible to simplify the process according to the invention by reacting a mixture of the dye with formaldehyde and the halocarboxylic amide in the single step process, instead of making a start from the finished methylol derivatives.

The resulting 1,4-diphenyl-alkylaminoanthraquinone compounds are sulphurised by conventional methods in concentrated sulphuric acid or in oleum under mild conditions, e.g., at room temperature, or with chlorosulphuric acid in a solvent which does not participate in the reaction.

Furthermore, the α-bromacrylyl derivatives of the formula (1) can also be manufactured from the corresponding α,β-dibromopropional compounds by dehydrobromination. This dehydrohalogenation is carried out by conventional methods, e.g., by treatment with an alkali, preferably at low temperature.

The compounds of the formula (1) obtained by the present process and modifications thereof are new. They are excellent dyes and are suitable for dyeing and printing materials of the most diverse kind, e.g., those of animal origin, such as leather, silk and, above all, wool, as well as various synthetic fibres, e.g., of superpolyamides and superpolyurethanes. They are particularly suitable for dyeing from neutral to acid medium. The dyeings thus obtained on wool have excellent fastness to light, milling, perspiration and washing.

The new dyes are also suitable for dyeing and printing cellulosic materials, such as cotton and regenerated cellulose fibres, whereby they are subjected to a heat treatment in the presence of alkali, e.g., in the presence of sodium (hydrogen) carbonate, sodium hydroxide or trisodium phosphate, in order to fix the dyes.

In particular, they are suitable for dyeing wool from a slightly acid, e.g., acetic acid, bath in the presence of wetting and levelling agents, in particular in the presence of polyglycol ether derivatives which contain on average 5 to 10 —CH₂—CH₂—O groups and are derived from primary monamines which contain an aliphatic hydrocarbon radical with 15 to 20 carbon atoms. The dyeings thus obtained are distinguished by good wet fastness properties and good levellness characteristics, it being possible to additionally improve the wet fastness properties of the dyeings by increasing the pH of the dyebath to a slightly alkaline, e.g., ammoniacal, reaction at the conclusion of the dyeing process. Chlorinated wool can be advantageously dyed by such a process chiefly with the aim of reducing felting and shrinking as well as increasing the affinity to the dyes.

The following Examples illustrate the invention, the parts and percentages being by weight unless otherwise stated.

EXAMPLE 1

A mixture of 20.10 parts of the compound of the formula

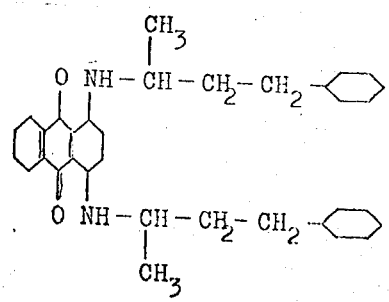

(obtained by the condensation of quinizarine or leucoquinizarine with 1-phenyl-3-amino-butane) and 11 parts of N-methylolchloroacetamide is added to 300 parts of 93 percent sulphuric acid at a temperature of 5°–10°C, and the mixture is subsequently stirred for 24 hours at 5°–10°C. The reaction mixture is then poured on ice. The precipitate of the condensation product is then filtered off and the filter product is washed with water until the filtrate shows neutral reaction. The condensation product is subsequently dried in vacuo at 65°–70°C. The sulphurisation is carried out by adding 20 parts of the condensation product in 220 parts of oleum, which contains 6 percent sulphur trioxide, at a temperature of 0°–5°C and stirring the mixture further at this temperature for 18 hours.

The sulphurised dye is isolated by pouring the sulphurisation mixture on 800 parts of ice water which contains 80 parts of sodium chloride, filtering off the precipitate of the dye, suspending this in water and adjusting the pH to 7 by adding sodium hydroxide solution at room temperature. The dye is precipitated as sodium salt by addition of sodium chloride, isolated, and dried in vacuo at 60°C. The dye is obtained as a blue powder which dissolves readily in water to give a blue colour. The dye produces on wool brilliant blue dyeings of good fastness to light and good wet fastness properties. Dyes with similar properties are obtained by using in Example 1 the following amines in place of the 1-phenyl-3-amino-butane for the 1,4-dicondensation with quinizarine or leucoquinizarine:

1-(2'-chlorophenyl)-2-amino-propane,
1-(4'-chlorophenyl)-2-amino-propane,
1-(2'-methylphenyl)-2-amino-propane,
1-(4'-methylphenyl)-2-amino-propane,
1-(2',4'-dimethylphenyl)-2-amino-propane,
1-(2'-methoxyphenyl)-2-amino-propane,
1-phenyl-2-amino-butane,
1-(2'-methylphenyl)-3-amino-butane,
1-(4'-methylphenyl)-3-amino-butane,
1-(2',4'-dimethylphenyl)-3-amino-butane,
1-(2'-chlorophenyl)-3-amino-butane,
1-(4'-chlorophenyl)-3-amino-butane,
1-(2'-methoxyphenyl)-3-amini-butane,
1-phenyl-2-methyl-3-amino-butane,
1-(2'-methylphenyl)-2-methyl-3-amino-butane,
1-phenyl-3-amino-pentane,
2-phenyl-2-methyl-4-amino-pentane,
2-(4'-methylphenyl)-2-methyl-4-amino-pentane,
1-phenyl-3-methyl-2-amino-butane,
1-phenyl-2-amino-pentane.

EXAMPLE 2

At a temperature of 20°C 0.1 part of hydroquinone is added to 65 parts of 93 percent sulphuric acid and then 13.70 parts of α-chloroacrylonitrile are added. The resulting solution is stirred for 3 hours at a temperature of 33°–35°C, then cooled to 10°C and, at a temperature of 10°–12°C, 7,50 parts of dichlorodimethyl ether are added dropwise within 1 hour. The mixture is subsequently stirred for 6 hours at a temperature of 10°–15°C.

To this mixture are then added 25.10 parts of the compound of the formula

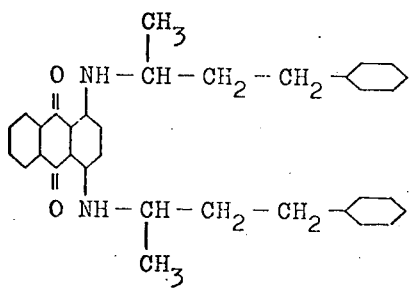

and the resulting solution is stirred for 18 hours at the same temperature. The condensation product of the general formula

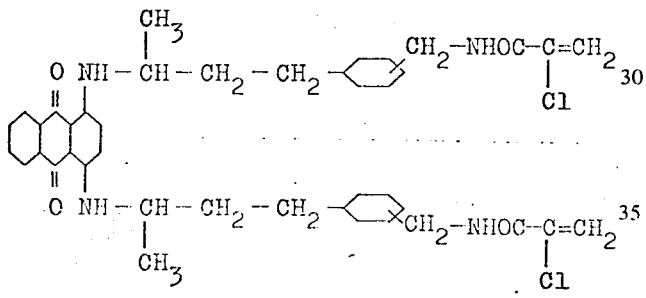

is isolated by pouring the mixture on ice. The conversion into the dye is carried out by subsequent sulphurisation in 5 percent oleum, as described in detail in Example 1.

The resulting dye produces on wool brilliant blue dyeings of good fastness to light and good wet fastness properties.

A dye with similarly good properties is obtained by using in the above Example 20.8 parts of α-bromacrylonitrile instead of α-chloroacrylonitrile, and otherwise carrying out the same process.

EXAMPLE 3

A homogeneous mixture of 13.35 parts of the compound of the formula

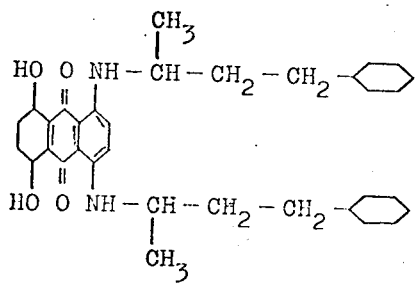

(obtained by reaction of 1,4,5,8-tetroxy- or 1,4,5,6-leucotetroxy-anthraquinone with 1-phenyl-3-amino-butane) and 6.48 parts of N-methylolchloroacetamide is added to 200 parts of 93 percent sulphuric acid at a temperature of 5°–10°C and stirring of the mixture is continued for 16 hours at this temperature. The resulting solution is then poured on ice, the precipitated condesnation product filtered off and washed with water until the filtrate shows neutral reaction. The condensation product is then dried in vacuo at 40°–50°C.

The sulphurisation is carried out by adding 18 parts of the condensation product to 180 parts of oleum (6 percent sulphur trioxide content) at 0°–5°C and stirring the mixture further for 17 hours at 0°–5°C. The sulphurisation is then finished. The mixture is poured on 500 parts of ice water containing 90 parts of sodium chloride, the dye which has formed is filtered off and again suspended in water. The pH is adjusted to 7 with sodium hydroxide at room temperature, the dye precipitated by addition of sodium chloride, then filtered and dried in vacuo at 60°–70°C. Applied to wool the dye produces brilliant greenish blue dyeings of good fastness to light and good wet fastness properties. Similarly good, brilliant greenish blue dyeings are obtained by using 12.95 parts of the condensation product of 1,4,5-trioxy- or 1,4,5-lecuotrioxy-anthraquinone instead of the 13.35 parts of the above dye base and otherwise carrying out the experiment as in Example 3.

EXAMPLE 4

A homogeneous mixture of 20.10 parts of the compound of the formula

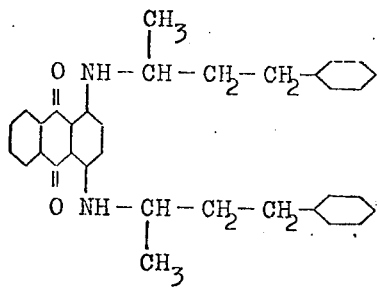

(obtained in known manner by reaction of quinizarine or leucoquinizarine with 1-phenyl-3-amino-butane) and 23 parts of N-metholyl-2,3-dibromo-propionic amide is added to 300 parts of 93 percent sulphuric acid at a temperature of 5°–10°C and the resulting solution is stirred for 24 hours at the same temperature.

The mixture is then poured on ice, the resulting precipitate of the condensation product is filtered off and washed with water until the filtrate shows neutral reaction. The condensation product is then dried in vacuo at 70°C.

The sulphurisation is carried out by adding 15 parts of the condensation product to 150 parts of oleum (5 percent content of free sulphur trioxide) at a temperature of 20°–22°C and subsequently stirring the solution for 18 hours at the same temperature.

The dye which has formed is isolated by pouring the mixture on 600 parts of ice water containing 60 parts of sodium chloride. The precipitate is filtered off, suspended in water and the pH of the mixture is adjusted to 7 by addition of sodium hydroxide solution. The resulting dye is precipitated by addition of sodium chloride, filtered off, and dried in vacuo at a temperature of 70°C. The dye is obtained as a blue powder which readily dissolves in water to give a blue colour.

Applied to wool, the dye produces very brilliant blue dyeings which are distinguished by good fastness to light and very good wet fastness properties. Dyes with similarly good tinctorial properties are obtained by using 22.8 parts of the compound of the formula

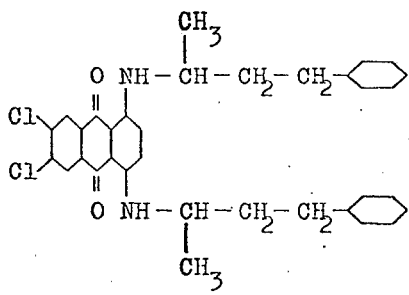

or 21.45 parts of the compound of the formula

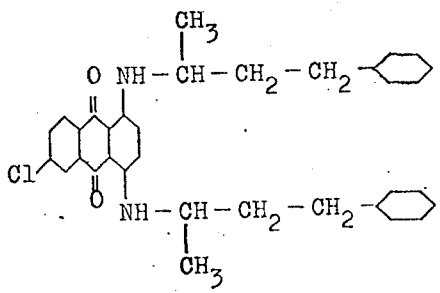

instead of the anthraquinone compound cited at the outset and otherwise carrying out the same procedure.

EXAMPLE 5

A homogeneous mixture of 19 parts of the compound of the formula

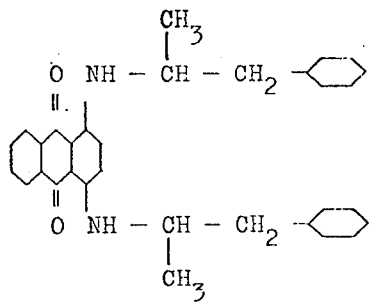

(obtained by reaction of quinizarine or leucoquinizarine with 1-phenyl-2-amino-propane) and 11 parts of N-methylolchloroacetamide is added to 300 parts of 93 percent sulphuric acid at a temperature of 5°–10°C and the mixture is then stirred for 24 hours at the same temperature.

Subsequently the resulting solution is poured on ice, the precipitated condensation product is filtered off and washed with water until the filtrate shows neutral reaction, whereupon the condensation product is dried in vacuo at 70°C.

The sulphurisation is carried out by adding 20 parts of the condensation product to 200 parts of oleum (5 percent sulphur trioxide content), the temperature being kept at 20°–25°C. The mixture is subsequently stirred for 20 minutes at the same temperature.

The dye which has formed is isolated by pouring the mixture on 800 parts of ice water which contains 80 parts of sodium chloride. The precipitate is filtered off, suspended in water and the mixture neutralised with sodium hydroxide at room temperature to a pH of 7. The dye is precipitated as sodium salt by addition of sodium chloride, filtered, and dried at 70°C in vacuo.

Applied to wool, the dye produces very brilliant blue dyeings of good fastness to light and very good wet fastness properties.

Dyes with similarly good tinctorial and fastness properties are obtained by using in the above Example 15.9 parts of N-methylol-α-bromacrylamide or 11.9 parts of N-methylol-α-chloroacrylamide instead of 11 parts of N-methylolchloroacetamide.

DYEING INSTRUCTION 1.5 parts of the dye which can be obtained according to Example 1 is dissolved in 4,000 parts of water and 4 parts of ammonium sulphate, 5 parts of crystallised sodium sulphate, 1 part of 80 percent acetic acid and 1 part of the adduct of oleylamine and ethylene oxide (the manufacture of which is described hereinbelow) are added. Thoroughly wetted chlorinated wool (100 parts) is put into this dyebath at 30°C. The dyebath is brought to the boil in the course of 30 minutes and dyeing is carried out for 50 minutes at the boil. The bath is then cooled to 80°C and adjusted to pH 8.5 by addition of ammonia. The wool is dyed in this bath for a further 15 minutes. Finally it is rinsed with cold water and dried. The wool is dyed in brilliant blue shades which are fast to washing and of good fastness to light.

Manufacture of the ethylene oxide adduct 100 parts of industrial oleylamine are treated with 1 part of finely divided sodium and the mixture is heated to 140°C, whereupon ethylene oxide is passed in at 135°C to 140°C. As such as the ethylene oxide has been quickly taken up, the reaction temperature is lowered to 120°–125°C and the passing in of ethylene oxide is continued until 133 parts thereof have been taken up. The reaction product obtained in this manner dissolves in water to give a practically clear solution.

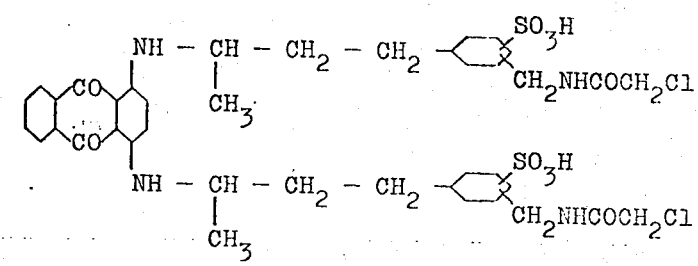

We claim:

1. Fibre-reactive anthraquinone compounds of the formula

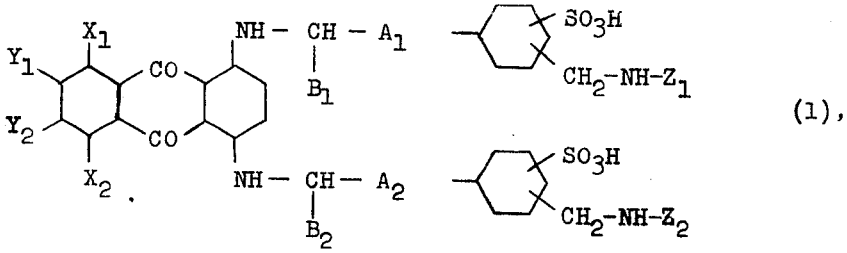

(1), wherein $X_1$ and $X_2$ each represents a hydrogen atom or a hydroxy group and $Y_1$ and $Y_2$ each represents a hydrogen atom or a halogen atom, $A_1$ and $A_2$ each represents an alkylene radical with 1 to 4 carbon atoms or a direct bond, $B_1$ and $B_2$ each represents an alkyl radical with 1 to 5 carbon atoms, the total number of carbon atoms in $A_1$ and $B_1$ and $A_2$ and $B_2$ being not greater than 5, and $Z_1$ and $Z_2$ each represents chloroacetyl, bromoacetyl, chloropropionyl, bromopropionyl, α,B-dichloropropionyl, α,B-dibromopropionyl, α-chloroacryloyl or α-bromoacryloyl, and wherein both phenyl radicals can contain further substituents selected from the group consisting of chlorine, bromine, lower alkyl or lower alkoxy.

2. Fibre-reactive anthraquinone compounds according to claim 1, of the formula (1), wherein $X_1$, $X_2$, $Y_1$ and $Y_2$ represent hydrogen atoms.

3. Fibre-reactive anthraquinone compounds according to claim 1, of the formula (1), wherein $A_1$ and $A_2$ and $B_1$ and $B_2$ represent the same alkylene and alkyl radicals respectively.

4. Fibre-reactive anthraquinone compounds according to claim 3, of the formula (1), wherein $A_1$ and $A_2$ represent the ethylene radical and $B_1$ and $B_2$ represent the methyl radical.

5. Fibre-reactive anthraquinone compounds according to claim 1, of the formula (1), wherein $Z_1$ and $Z_2$ represent the same acyl radicals.

6. Fibre-reactive anthraquinone compounds according to claim 1, of the formula (1), wherein $Z_1$ and $Z_2$ each represents a chloroacetyl, α,β-dibromopropionyl or α-bromacrylyl radical.

7. Fibre-reactive anthraquinone compounds according to claim 1, of the formula (1), wherein with the exception of the sulphonic acid group and the haloacylaminomethyl group both phenyl radicals contain no further substituents.

8. The fibre-reactive anthraquinone compound according to claim 7, of the formula